United States Patent
Szczepanski (10) Patent No.: US 10,975,791 B1
(45) Date of Patent: Apr. 13, 2021

(54) SYSTEM AND METHOD FOR PARTICULATE FILTER REGENERATION

(71) Applicant: DENSO International America, Inc., Southfield, MI (US)

(72) Inventor: Edward Szczepanski, Grosse Pointe Woods, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/713,263

(22) Filed: Dec. 13, 2019

(51) Int. Cl.
| | |
|---|---|
| F01N 9/00 | (2006.01) |
| F02D 41/14 | (2006.01) |
| F01N 13/10 | (2010.01) |
| F01N 3/10 | (2006.01) |
| F01N 13/08 | (2010.01) |
| F02D 41/02 | (2006.01) |

(52) U.S. Cl.
CPC ......... *F02D 41/1458* (2013.01); *F01N 3/101* (2013.01); *F01N 9/002* (2013.01); *F01N 13/082* (2013.01); *F01N 13/10* (2013.01); *F02D 41/029* (2013.01)

(58) Field of Classification Search
CPC .... F02D 41/1458; F02D 41/029; F01N 3/101; F01N 9/002; F01N 13/082; F01N 13/10
See application file for complete search history.

(56) References Cited

U.S. PATENT DOCUMENTS

| | | | | |
|---|---|---|---|---|
| 5,570,574 A | * | 11/1996 | Yamashita | F02B 75/22 123/692 |
| 6,779,339 B1 | * | 8/2004 | Laroo | F01N 3/0253 60/274 |
| 8,336,300 B2 | | 12/2012 | Hepburn et al. | |
| 2007/0251219 A1 | * | 11/2007 | Uphoff | F01N 3/32 60/289 |
| 2010/0064665 A1 | * | 3/2010 | Eckhoff | F01N 3/0814 60/284 |
| 2012/0138017 A1 | * | 6/2012 | Jentz | F02D 41/0025 123/436 |

(Continued)

FOREIGN PATENT DOCUMENTS

WO 2018/024391 2/2018

OTHER PUBLICATIONS

Brandt et al, Dynamic Modeling of a Three-Way Catalyst for SI Engine Exhaust Emission Control, IEEE Transactions on Control Systems Technology, vol. XX, No. Y, pp. 1-9, 1999.

*Primary Examiner* — Jacob M Amick
(74) *Attorney, Agent, or Firm* — Burris Law, PLLC (57) ABSTRACT

A system for regeneration of a particulate filter in a V-pipe exhaust system includes a pair of post-converter universal heated exhaust gas oxygen (UHEGO) sensors disposed at a pair of pipes of the V-pipe exhaust system downstream from a pair of three-way catalytic (TWC) converters and the pair of post-converter UHEGO sensors measure lambda values. The system also includes an engine controller in communication with the pair of post-converter UHEGO sensors. The engine controller is configured to receive and compare measured lambda values from the pair of post-converter UHEGO sensors to a target exhaust gas lambda value for exhaust gas flowing into the particulate filter and provide at least one adjusted target exhaust gas lambda value as a function of a difference between the measured lambda values and the target exhaust gas lambda value.

20 Claims, 4 Drawing Sheets

(56) References Cited

U.S. PATENT DOCUMENTS

2012/0260631 A1* 10/2012 Winkler .............. F01N 3/105
                                                          60/274
2019/0032585 A1    1/2019 Kelly et al.

* cited by examiner

SYSTEM AND METHOD FOR PARTICULATE FILTER REGENERATION

FIELD

The present disclosure relates to particulate filter regeneration, and particularly, lambda imbalance particulate filter regeneration in V-pipe exhaust systems.

BACKGROUND

The statements in this section merely provide background information related to the present disclosure and may not constitute prior art.

An internal combustion engine (ICE) typically includes an exhaust system to route or handle exhaust gas (i.e., combusted gases) expelled from one or more cylinders of the ICE. And the exhaust system can include a particulate filter (PF) to trap particulate matter (e.g., carbon and carbon containing particles) flowing in the exhaust gas and through the exhaust system. However, if the PF is not periodically cleaned or regenerated, accumulated particulate matter on or in the PF may cause an increase in exhaust system back-pressure, thereby leading to decreased engine performance.

Regenerating the PF of particulate matter includes increasing the exhaust gas temperature such that particulate matter (typically referred to as "soot") accumulated is oxidized and removed from the PF. In some cases, the PF may reach a high enough exhaust temperature during normal vehicle operation to passively perform a PF regeneration (also known as passive PF regeneration). However, due to the PF being located downstream from an oxidizing catalyst (e.g. three-way catalyst)), reaching a desired PF regeneration temperature may not occur during extended low load operation of the ICE. Accordingly, active PF regeneration is employed in current ICE exhaust systems by adjusting the ICE operation such that an oxygen rich exhaust gas and a separate reductant rich exhaust gas are provided and mix prior to and while flowing through the PF. Also, the mixed oxygen rich and reductant rich exhaust gas in the presence of a platinum group metal in the PF typically results in exothermic reactions that increase the temperature of the exhaust gas and the PF.

Issues related to active PF regeneration and other issues related to exhaust systems with particulate filters is discussed in the present disclosure.

SUMMARY

This section provides a general summary of the disclosure and is not a comprehensive disclosure of its full scope or all of its features.

In one form, the present disclosure is directed toward a system for regeneration of a particulate filter in a V-pipe exhaust. The system includes a pair of post-converter universal heated exhaust gas oxygen (UHEGO) sensors disposed at a pair of pipes of the V-pipe exhaust system downstream from a pair of three-way catalytic (TWC) converters and the pair of post-converter UHEGO sensors measure lambda values. The system also includes an engine controller in communication with the pair of post-converter UHEGO sensors. The engine controller is configured to receive and compare measured lambda values from the pair of post-converter UHEGO sensors to a target exhaust gas lambda value for exhaust gas flowing into the particulate filter and provide at least one adjusted target exhaust gas lambda value as a function of a difference between the measured lambda values and the target exhaust gas lambda value.

In one form, the present disclosure is directed toward a method for regeneration of a particulate filter in a V-pipe exhaust. The method includes controlling a rate of temperature increase of exhaust gas passing through the particulate filter by adjusting target exhaust gas lambda values for a pair of pre-converter universal heated exhaust gas oxygen (UHEGO) sensors located upstream from a pair of three-way catalytic (TWC) converters disposed at a pair of pipes of the V-pipe exhaust. A difference between a target exhaust gas lambda value for the exhaust gas flowing into the particulate filter and a measured lambda value for each of the pair of post-converter UHEGO sensor is calculated and the target exhaust gas lambda values for the pair of pre-converter UHEGO sensors are adjusted as a function of the calculated difference between the target exhaust gas lambda value for the exhaust gas flowing into the particulate filter and the measured lambda values for the pair of post-converter UHEGO sensors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In one form, the present disclosure is directed toward a system for regeneration of a particulate filter (PF) in a V-pipe exhaust system of an internal combustion engine (ICE) includes a pair of post-converter universal heated exhaust gas oxygen (UHEGO) sensors disposed in a pair of pipes of the V-pipe exhaust system and an engine controller in communication with the pair of post-converter UHEGO sensors. The pair of post-converter UHEGO sensors are disposed downstream from a pair of three-way catalytic (TWC) converters. The engine controller is configured to receive and compare measured (i.e., real-time) lambda values from the pair of post-converter UHEGO sensors to a target exhaust gas lambda value for exhaust gas (also referred to herein as "target exhaust gas lambda value") flowing into the PF. Also, the engine controller provides at least one adjusted target exhaust gas lambda value (also referred to herein as "adjusted target exhaust gas lambda value") as a function of a difference between the measured lambda values for the pair of post-converter UHEGO sensors and the target exhaust gas lambda values. The measured lambda values from the pair of post-converter UHEGO sensors provide enhanced control of lambda imbalance regeneration of the PF, thereby reducing the chances of damaging the PF during regeneration and/or emissions slip from ICE according to the teachings of the present disclosure.

Figure 1:
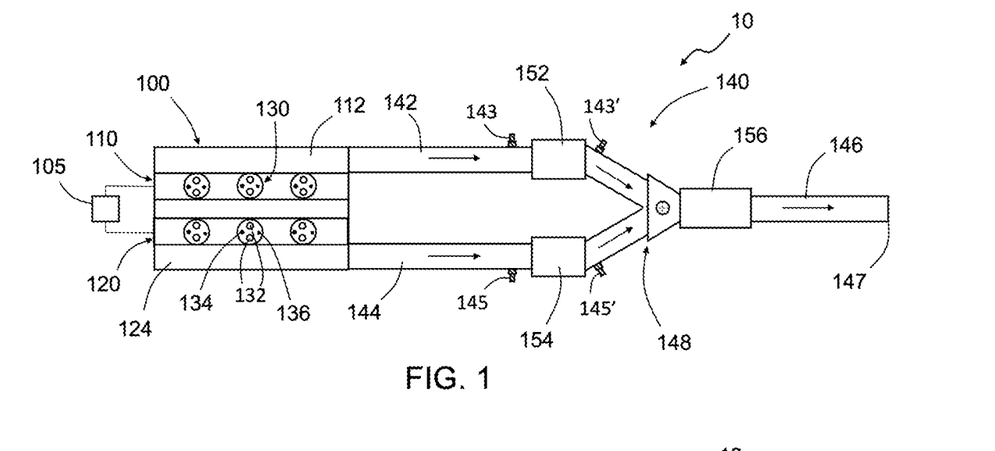
FIG. 1 shows a system for regeneration of a particulate filter according to one form of the present disclosure.

Referring to FIG. 1, a system 10 for lambda imbalance regeneration of a particulate filter disposed in an exhaust system 140 (also referred to herein as a "V-pipe exhaust system") of an ICE 100 is shown. The ICE 100 includes an engine controller 105, a first cylinder bank 110, and a second cylinder bank 120 (collectively as a "pair of cylinder banks 110, 120"). Each of the pair of cylinder banks 110, 120 includes one or more cylinders 130 and each cylinder 130 includes at least two valves 132 (e.g., an intake valve and an exhaust valve), a fuel injector 134, and a spark initiator 136 (e.g., a spark plug). A first manifold 112 and a second manifold 124 (collectively as a "pair of manifolds 112, 124") are in fluid communication with the first cylinder bank 110 and the second cylinder bank 120, respectively.

The V-pipe exhaust system 140 includes a pair of pipes 142, 144 in fluid communication with an exit pipe 146 via a V-shaped pipe section 148. For example, the V-pipe exhaust system 140 includes a first pipe 142 in fluid communication with the first manifold 112 and the V-shaped pipe section 148, and a second pipe 144 in fluid communication with the second manifold 124 and the V-shaped pipe section 148.

The system 10 includes various components along the V-pipe exhaust system 140 to filter exhaust gas flowing therethrough. For example, the system 10 includes a pair of three-way catalytic (TWC) converters 152, 154, and a particulate filter (PF) 156. The pair of TWC converters 152, 154 are disposed in the pair of pipes 142, 144 such that a first TWC converter 152 is disposed in the first pipe 142 and a second TWC converter 154 is disposed in the second pipe 144, as shown in FIG. 1. The PF 156 is disposed in the V-pipe exhaust system 140 downstream from the pair of TWC converters 152, 154, and more particularly, disposed in the exit pipe 146 downstream from the pair of TWC converters 152, 154.

During operation of the ICE 100, the engine controller 105 directs fuel via the fuel injector 134 and air via the intake valve (one of the valves 132) into each of the cylinders 130. The engine controller 105 also directs firing of each of the spark initiators 136 such that the fuel plus air mixture in each cylinder 130 is combusted and expelled from each of the cylinders 130 via the exhaust valve (the other valve 132) as exhaust gas (not labeled). The exhaust gas expelled from the cylinders 130 flows through the pair of manifolds 112, 124, the pair of pipes 142, 144, the pair of TWC converters 152, 154, the PF 156 and the exit pipe 146 where it exits the V-pipe exhaust system 140 at outlet 147. As the exhaust gas flows through the pair of pipes 142, 144, each of the TWC converters 152, 154 provides reduction of nitrogen oxides (NOx) to nitrogen (N2), oxidation of carbon monoxide (CO) to carbon dioxide ($CO_2$), and oxidation of unburnt hydrocarbons (HC) into $CO_2$ and water ($H_2O$).

The PF 156 provides particulate emissions control of the exhaust gas from the ICE 100. Specifically, the exhaust gas flowing from the TWC converters 152, 154 includes small particulates (also referred to herein as "particles") of unburnt HC and the PF 156 traps and holds the particles to prevent their emission into the atmosphere.

Accumulation of the unburnt HC particles (referred to herein simply as "particulate mass" or "soot") in the PF 156 increases backpressure in the V-pipe exhaust system 140 which can lead to a decrease in efficiency of the ICE 100. Accordingly, the soot in the PF 156 is periodically oxidized during operation of the ICE 100 such that backpressure in the V-pipe exhaust system 140 is reduced. Oxidation of the particulate mass in the PF 156 is known as and is referred to herein as "regeneration of the PF 156." It should be understood that the regeneration of the PF 156 can occur passively (i.e., during normal operation of and without additional measures or adjustments to the ICE 100).

However, in some circumstances, for example during low temperature duty cycles of the ICE 100, active regeneration of the PF 156 is desired. In such circumstances the ICE 100 with the V-pipe exhaust system 140 as shown in FIG. 1 can provide a rich exhaust gas from one of the pair of cylinder banks (e.g., the first cylinder bank 110 or the second cylinder bank 120) and a lean exhaust gas from the other cylinder bank (e.g., the second cylinder bank 120 or the first cylinder bank 110) such that a mixture of the exhaust gases upstream of the PF 156 results in exothermic reaction(s) between reductants originating from the rich exhaust gas and oxygen (i.e., air) originating from the lean exhaust gas. That is, exhaust gas with an excess of reductants flows from one of the first and second cylinder banks 110, 120, exhaust gas with an excess of oxygen flows from another of the first and second cylinder banks 110, 120, and the exhaust gases from the first and second cylinder banks 110, 120 meet and mix in front of the PF 156. In some variations, the PF 156 includes platinum group metals (e.g., Pt, Pd, Rh) and/or metal oxides (e.g., $V_2O_5$, $CeO_2$) which at "light-off" temperatures less than or equal to 400° C. result in catalyzed exothermic reactions that increase the temperature of the exhaust gas and thereby provide the desired increase in heat to the exhaust gas and PF 156.

It should be understood that it is undesirable for a given cylinder bank to operate under a rich condition or a lean condition for an extended time period. Accordingly, the first and second cylinder banks 110, 120 alternate or cycle between producing a rich exhaust gas and a lean exhaust gas. As used herein, the term "rich" refers to an exhaust gas mixture that has more fuel than is required for stoichiometric combustion and the term "lean" refers to an exhaust gas mixture that has more oxygen than is required for stoichiometric combustion. The exothermic reaction(s) increase the temperature of the exhaust gas passing through the PF 156 above a threshold temperature at which the particulate mass in the PF 156 oxidizes. Such a method of using a rich exhaust gas from one of the cylinder banks and a lean exhaust gas from the other cylinder bank is known as and referred to herein as "lambda imbalance regeneration." And as discussed in greater detail below, the system 10 disclosed in the present disclosure enhances lambda imbalance regeneration of particulate filters.

Still referring to FIG. 1, the system 10 includes a first pre-converter UHEGO sensor 143 and a second pre-converter UHEGO sensor 145 (collectively as a "pair of pre-converter UHEGO sensors 143, 145) disposed at the first pipe 142 and the second pipe 144, respectively, upstream from the first and second TWC converters 152, 154, respectively. In some variations of the present disclosure the first pre-converter UHEGO sensor 143 is disposed in the first pipe 142 and the second pre-converter UHEGO sensor 145 is disposed in the second pipe 144. The system 10 also includes a first post-converter UHEGO sensor 143' and a second post-converter UHEGO sensor 145' (collectively as a "pair of post-converter UHEGO sensors 143', 145'") disposed at the first pipe 142 and the second pipe 144, respectively, downstream from the first and second TWC converters 152, 154, respectively. In some variations of the present disclosure the first post-converter UHEGO sensor 143' is disposed in the first pipe 142 and the second post-converter UHEGO sensor 145' is disposed in the second pipe 144.

The pair of pre-converter UHEGO sensors 143, 145 and the pair of post-converter UHEGO sensors 143', 145' are in communication with the engine controller 105 by way of, for example, a vehicle communication network (not shown) such as controller area network (CAN), local interconnect network (LIN). It should be understood that a UHEGO sensor provides real time lambda ($\lambda$) values in contrast to simple "rich" and "lean" indicators as with heat exhaust gas oxygen (HEGO) sensors. That is, a UHEGO sensor provides an actual lambda ($\lambda$) value for an exhaust gas flowing past the UHEGO sensor. It should also be understood that as used herein the term "lambda" and the symbol "$\lambda$" refers to the air-fuel ratio in an exhaust gas where $\lambda$ equal to 1.0 ($\lambda$ 1.0) refers to the stoichiometric air-fuel ratio, i.e., the exhaust gas contains the exact amount of fuel and air needed for stoichiometric combustion. Also, for $\lambda<1.0$ refers to an air-fuel ratio for exhaust gas with more fuel than air needed for stoichiometric combustion (also referred to herein as "rich" or "rich mixture"), and $\lambda>1.0$ refers to an air-fuel ratio for exhaust gas with less fuel than air needed for stoichiometric combustion (also referred to herein as "lean" or "lean mixture").

While specific sensors are illustrated, the system 10 may include other sensors for monitoring the performance of the system 10. For example, one or more pressure sensors and/or temperature sensors may be disposed along the V-pipe exhaust system 140 to measure backpressure and temperature.

As provided above, under certain operating condition, the engine controller 105 controls the ICE 100 to provide an active regeneration of the PF 156 by expelling rich and lean exhaust gas through the pair of V-pipes. Specifically, the engine controller 105 controls the valves 132, the fuel injectors 134, and/or the spark initiators 136 of the ICE 100 to have the first cylinder bank 110 expel a rich (i.e., $\lambda<1.0$) exhaust gas into the first manifold 112 and to have the second cylinder bank 120 expel a lean (i.e., $\lambda>1.0$) exhaust gas into the second manifold 124 for a first predetermined amount of time. To inhibit exposure of the pair of TWC converters 152, 154 to greater than desired lean or rich exhaust gas, the engine controller 105 switches the operation of the first cylinder bank 110 and the second cylinder bank 120 to have the first cylinder bank 110 expel a lean (i.e., $\lambda>1.0$) exhaust gas and the second cylinder bank 120 to expel a rich (i.e., $\lambda<1.0$) exhaust gas. This rich/lean cycle for the first cylinder bank 110 and the lean/rich cycle for second cylinder bank 120 results in an increase in temperature of the exhaust flowing through the PF 156 until and/or after the threshold temperature needed regeneration of the PF 156 is reached oxidation of the particulate mass in the PF 156 begins. It should be understood that the engine controller 105 executes or commands the rich/lean cycle as a function of factors such as time, number of combustion cycles of the first cylinder bank 110 and/or the second cylinder bank 120, a flow rate of exhaust gas through the first pipe 142 and/or second pipe 144, and fuel flow rate for the first cylinder bank 110 and/or the second cylinder bank 120, among others.

Accordingly, one measure or indicator of the "richness" or "leanness" of the exhaust gas flowing through the pair of manifolds 112, 124 and into the pair of pipes 142, 144 is provided by $\lambda$ values detected or measured by the pair of pre-converter UHEGO sensors 143, 145. For example and for illustrative purposes only, if the pre-converter UHEGO sensor 143 measures $\lambda=1.020$, the engine controller 105 determines that the exhaust gas provided by the first cylinder bank 110 is a lean exhaust gas, and if the pre-converter UHEGO sensor 143 measures $\lambda=0.980$, the engine controller 105 determines the exhaust gas provided by the first cylinder bank 110 is a rich exhaust gas. Similar lean/rich determination may also be made for exhaust gas from the second cylinder bank 120 based on $\lambda$ measurements from the pre-converter UHEGO sensor 145. In addition, the engine controller 105 may compare the $\lambda$ values from the pair of pre-converter UHEGO sensors 143, 145 with a target $\lambda$ value for exhaust gas flowing into the PF 156 to evaluate regeneration of the PF 156.

Still referring to FIG. 1, it should be understood that exhaust gas flowing through and exiting the pair of TWC converters 152, 154 may have a different composition and $\lambda$ value than before flowing into the pair of TWC converters 152, 154. For example, and as noted above, one function or property of a TWC converter is to oxidize unburned HCs in the exhaust gas, thereby changing the measured air-fuel ratio of the exhaust gas. Accordingly, in one form, the pair of post-converter UHEGO sensors 143', 145' provide $\lambda$ values detected or measured downstream from the pair of TWC converters 152, 154 to the engine controller 105. The engine controller 105 uses the $\lambda$ values from the pair of post-converter UHEGO sensors 143', 145' to provide an adjusted target $\lambda$ value. That is, the measured $\lambda$ values from the pair of post-converter UHEGO sensors 143', 145' provide the engine controller 105 with actual rich and/or lean values of the exhaust gas downstream from the pair of TWC converters 152, 154, thereby providing a more accurate composition measure of the exhaust gases that are mixed and flow through the PF 156. Also, the more accurate composition measure of the exhaust gases in the pair of pipes 142, 144 provide enhanced control of the regeneration of the PF 156.

In some variations of the present disclosure, the adjusted target $\lambda$ value may be an adjusted target $\lambda$ value for the first pre-converter UHEGO sensor 143 (adjusted $\lambda_1$), an adjusted target $\lambda$ value for the second pre-converter UHEGO sensor 145 (adjusted $\lambda_2$), or a combination thereof (i.e., adjusted $\lambda_1$ and adjusted $\lambda_2$). In the alternative, or in addition to, the adjusted target $\lambda$ value may be an adjusted target $\lambda$ value for the first post-converter UHEGO sensor 143' (adjusted $\lambda_{1'}$), an adjusted target $\lambda$ value for the second post-converter UHEGO sensor 145' (adjusted $\lambda_{2'}$), or a combination thereof (i.e. adjusted $\lambda_{1'}$ and adjusted $\lambda_{2'}$). It should be understood that the adjusted target $\lambda$ value(s) can be used by the engine controller 105 to have the first cylinder bank 110 generate a richer or leaner exhaust gas and to have the second cylinder bank 120 generate a leaner or richer exhaust gas, respectively. A method of using the system 10 is described in greater detail below.

Figure 2:
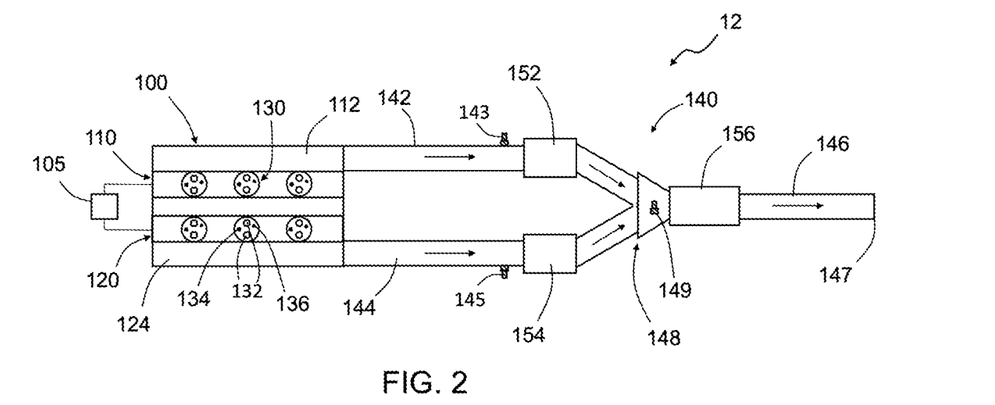
FIG. 2 shows a system for regeneration of a particulate filter according to another form of the present disclosure.

While FIG. 1 shows a pair of post-converter UHEGO sensors downstream from the pair of TWC converters 152, 154, in another form of the present disclosure only one post-converter UHEGO sensor is used to enhance composition measurement of the exhaust gas that flows through the PF 156. Particularly, FIG. 2 illustrates a system 12 that provides enhanced regeneration of the PF 156. The system 12 is similar to system 10 with the exception that the two post-converter UHEGO sensors 143', 145' are replaced with a single post-converter UHEGO sensor 149. The post-converter UHEGO sensor 149 is in communication with the engine controller 105 and is disposed upstream of the PF 156. In some variations the post-converter UHEGO sensor 149 is disposed in the exit pipe 146. The post-converter UHEGO sensor 149, similar to the post-converter UHEGO sensors 143' and 145', provides a measured λ value ($λ_3$). However, and in contrast to the pair of post-converter UHEGO sensors 143', 145', the post-converter UHEGO sensor 149 provides measured λ values of the exhaust gas after it is mixed (not shown in FIG. 2). That is, the exhaust gas flowing through the first pipe 142 and the first TWC converter 152 and the exhaust gas flowing through the second pipe 144 and the TWC converter 154 are mixed before and/or during flowing through the PF 156. The post-converter UHEGO sensor 149 measures a λ value of the combined (mixed) exhaust before it flows into the PF 156, thereby providing a measured λ value (post-TWC converters) to the engine controller 105.

In one form of the present disclosure, the post-converter UHEGO sensor 149 provides the measured λ value(s) detected or measured downstream from the pair of TWC converters 152, 154 to the engine controller 105 and the engine controller 105 uses the measured λ value(s) from the post-converter UHEGO sensor 149 to provide an adjusted target λ value. That is, the measured λ value from the post-converter UHEGO sensor 149 provides the engine controller 105 with actual rich and/or lean values of the exhaust gas downstream from the pair of TWC converters 152, 154 and thereby, provides a more accurate composition measure of the mixed exhaust gas flowing through the PF 156. Also, the more accurate composition measure of the exhaust gas that flows through the PF 156 provides enhanced control of the regeneration of the PF 156. It should be understood that the adjusted target λ value provided by the engine controller 105 may be the same as described above with reference to the system 10 (FIG. 1). That is, in some variations the adjusted target λ value may be an adjusted target λ value for the first pre-converter UHEGO sensor 143 (adjusted $λ_1$), an adjusted target λ value for the second pre-converter UHEGO sensor 145 (adjusted $λ_2$), or a combination thereof (i.e., adjusted $λ_1$ and adjusted $λ_2$). In the alternative, or in addition to, the adjusted target λ value may be an adjusted target λ value for the post-converter UHEGO sensor 149 (adjusted λ').

Figure 3:
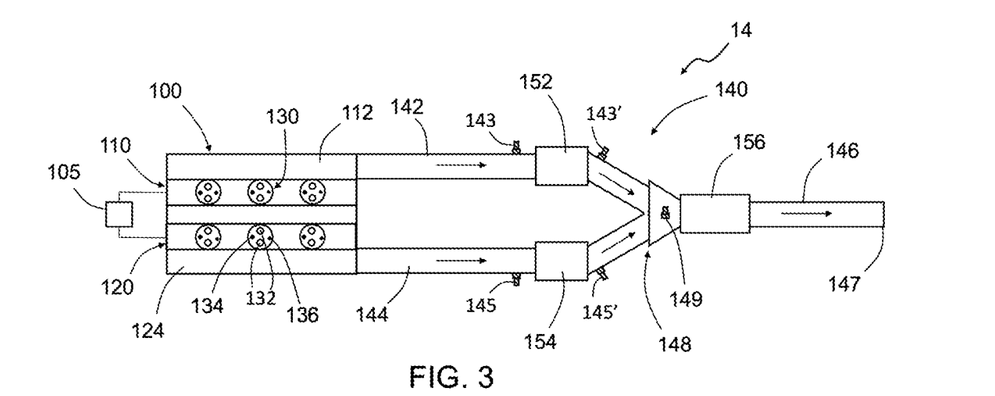
FIG. 3 shows a system for regeneration of a particulate filter according to still another form of the present disclosure.

Referring now to FIG. 3, in still another form of the present disclosure a system 14 that provides enhanced regeneration of the PF 156 is shown. The system 14 is similar to system 10 with the exception that the pair of post-converter UHEGO sensors 143', 145' are complemented with the post-converter UHEGO sensor 149. That is, in addition to the pair of post-converter UHEGO sensors 143', 145' disposed at the pair of pipes 142, 144 downstream of the pair of TWC converters 152, 154, the post-converter UHEGO sensor 149 is included and disposed downstream from the post-converter UHEGO sensors 143', 145' and upstream from the PF 156. Similar to the system 10 (FIG. 1) discussed above, the pair of post-converter UHEGO sensors 143', 145' provide λ values detected or measured from exhaust gas downstream from the pair of TWC converters 152, 154 to the engine controller 105. Also, the post-converter UHEGO sensor 149 provides measured λ values of the exhaust gas to the engine controller 105 after it has been mixed. The engine controller 105 uses the measured λ values from the pair of post-converter UHEGO sensors 143', 145' and/or the post-converter UHEGO sensor 149 to provide an adjusted target λ value. That is, in some variations of the present disclosure, the engine controller 105 uses the measured λ values from the pair of post-converter UHEGO sensors 143', 145' to provide an adjusted target λ value. In other variations the engine controller 105 uses the measured λ value from the post-converter UHEGO sensor 149 to provide an adjusted target λ value. In still other variations, the engine controller 105 uses the measured λ values from the pair of post-converter UHEGO sensors 143', 145' and the post-converter UHEGO sensor 149 to provide an adjusted target λ value.

It should be understood that the adjusted target λ value(s) provided by the engine controller 105 can be the same as described above with reference to system 10 (FIG. 1). That is, in some variations the adjusted target λ value may be an adjusted target λ value for the first pre-converter UHEGO sensor 143 (adjusted $λ_1$), an adjusted target λ value for the second pre-converter UHEGO sensor 145 (adjusted $λ_2$), or a combination thereof (i.e., adjusted $λ_1$ and adjusted $λ_2$). In the alternative, or in addition to, the adjusted target λ value may be an adjusted target λ value for the first post-converter UHEGO sensor 143' (adjusted $λ_{1'}$), an adjusted target λ value for the second post-converter UHEGO sensor 145' (adjusted $λ_{2'}$), or a combination thereof (i.e. adjusted $λ_{1'}$ and adjusted $λ_{2'}$). In another alternative, or in addition to, the adjusted target λ value may be an adjusted target λ value for the post-converter UHEGO sensor 149 (adjusted λ').

Figure 4:
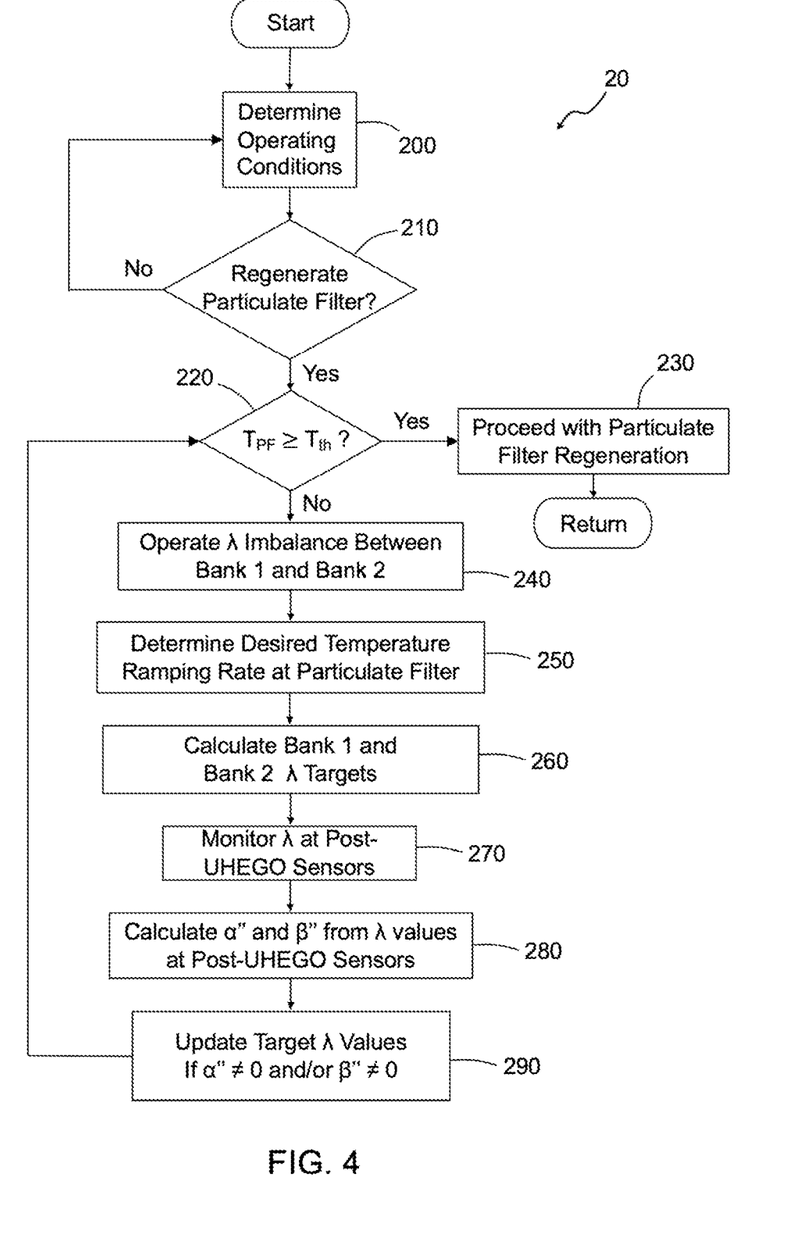
FIG. 4 is a flowchart of a method for regeneration of a particulate filter according to one form of the present disclosure.

Referring now to FIG. 4, a flowchart of a method 20 for regenerating the PF 156 using the system 10 shown in FIG. 1 is illustrated. The method 20 may be performed by the engine controller 105 when the ICE 100 is turned on. At 200, the engine controller 105 determines the operating conditions of the ICE 100 and at 210, determines if the PF 156 should undergo regeneration. For example, the V-pipe engine controller 105 monitors the operating conditions such as backpressure in the V-pipe exhaust system 140 and based on the measured backpressure and predefined backpressure thresholds, determines if regeneration of the PF 156 should be performed. If regeneration is not needed (i.e., 'No' at 210), the engine controller 105 returns to 200 to monitor the operating conditions of the ICE 100. If regeneration of the PF 156 is needed (i.e., 'Yes' at 210), the engine controller 105, at 220, determines if the temperature of the PF 156 ($T_{PF}$) is greater than or equal to a threshold temperature ($T_{th}$) needed for regeneration of the PF 156. If $T_{PF}$ is greater than or equal to $T_{th}$, then the controller 105 proceeds with PF 156 regeneration at 230. That is, the temperature of the PF 156 is sufficient for passive regeneration of the PF 156 during which the particulate mass is oxidized. The engine controller 105 then returns to determining the operating conditions of the ICE 100, at 200. In one form, the method is continued to be performed by the engine controller 105 until the ICE 100 is turned off.

If $T_{PF}$ is not greater than or equal to $T_{th}$ (i.e., less than), then the engine controller 105 initiates lambda imbalance regeneration of the PF 156, at 240. Specifically, the engine controller 105 determines a desired temperature ramp rate at the PF 156, at 250. That is, the engine controller 105 determines a desired heating rate for the exhaust gas flowing into the PF 156 by, for example, selecting a desired heating rate from a lookup table or calculating a desired heating rate using a PF regeneration algorithm or model.

In some variations, the engine controller 105 at 250 determines the desired heating rate and which of the first and second cylinder banks 110, 120 generate a lean exhaust gas and which of the first and second cylinder banks 110, 120 will generate a rich exhaust gas. In such variations, the engine controller 105 determines and commands the amount of time each of the first and second cylinder banks 110, 120 burn rich and/or lean such the desired heating ramp rate is provided while reducing possible detrimental effects to tailpipe emissions. Also, in at least one variation, the engine controller 105 determines and commands the amount of time each of the first and second cylinder banks 110, 120 burn rich and/or lean as a function of a torque request and/or fuel rate condition over time between the first and second cylinder banks 110, 120 such that the production of uneven particulate mass by one of the first and second cylinder banks 110, 120 (over time) is reduced or prevented and thereby reduces or prevents uneven loading of the pair of TWC converters 152, 154.

Based on the desired heating rate for exhaust gas flowing into the PF 156, the engine controller 105, at 260, calculates target $\lambda$ values for the first cylinder bank 110 and/or the second cylinder bank 120. The target $\lambda$ values for the first cylinder bank 110 and/or the second cylinder bank 120 may be the target $\lambda$ values of the exhaust gas upstream of the pair of TWC converters 152, 154 to be measured by the first and/or second pre-converter UHEGO sensors 143, 145. Based on the target $\lambda$ values, the engine controller 105 controls the operation of the ICE 100 to provide exhaust gas from the first cylinder bank 110 and/or the second cylinder bank 120 that meets the respective target $\lambda$ values.

At 270, the engine controller 105 monitors and compares $\lambda$ values from the post-converter UHEGO sensors 143', 145' with $\lambda$ values from the pre-converter UHEGO sensors 143, 145. The comparison of the post-converter and pre-converter $\lambda$ values provides the change (if any) in composition of the exhaust gas flowing through the pair of TWC converters 152, 154 and what change(s) to the target $\lambda$ values for the pre-converter UHEGO sensors 143, 145 may be needed in order to obtain desired $\lambda$ values from the post-converter UHEGO sensors 143', 145', and thereby more accurately control the rich or lean condition of the exhaust gas flowing into the PF 156.

At 280, the engine controller 105 calculates an $\alpha"$ value as a function of the $\lambda$ value for the first post-converter UHEGO sensor 143' and/or develops or calculates an $\beta"$ value as a function of the $\lambda$ value for the second post-converter UHEGO sensor 145'. The engine controller 105 then updates or adjusts a target $\lambda$ value, at 290.

The $\alpha"$ (also referred to herein as a "first delta") is defined as function of a difference between a measured $\lambda$ value from the post-converter UHEGO sensor measuring a lean exhaust gas mixture (referred to herein as $\lambda_{\alpha'm}$) and a target $\lambda$ value for exhaust gas flowing into the PF 156 (referred to herein as $\lambda_t$). The $\beta"$ (also referred to herein as a "second delta") is defined as a function of a difference between a measured $\lambda$ value from the post-converter UHEGO sensor measuring a rich exhaust gas mixture (referred to herein as $\lambda_{\beta'm}$) and $\lambda_t$. It should be understood that $\lambda_t$ is the measured $\lambda$ value that provides the desired heating rate for the PF 156 determined at 250 and is selected by the engine controller 105 from a lookup table or calculated from a PF regeneration algorithm or model. That is, when the first cylinder bank 110 is generating a lean exhaust gas and the second cylinder bank 120 is generating a rich exhaust gas, then $\alpha"$ is defined as function of a difference between a measured $\lambda$ value from the first post-converter UHEGO sensor 143' and $\lambda_t$, and $\beta"$ is defined as function of a difference between a measured $\lambda$ value from the second post-converter UHEGO sensor 145' and $\lambda_t$. In the alternative, when the first cylinder bank 110 is generating a rich exhaust gas and the second cylinder bank 120 is generating a lean exhaust gas, then $\alpha"$ is defined as function of a difference between a measured $\lambda$ value from the second post-converter UHEGO sensor 145' and $\lambda_t$, and $\beta"$ is defined as function of a difference between a measured k value from the first post-converter UHEGO sensor 143' and $\lambda_t$.

In some variations $\alpha"$ is an absolute difference or absolute value between $\lambda^t$ and $\lambda_{\alpha'm}$ (i.e., $\alpha"=\|\lambda_t-\lambda_{\alpha'm}\|$). Similarly, $\beta"$ is an absolute difference or absolute value between $\lambda_t$ and $\lambda_{\beta'm}$ (i.e., $\alpha"=|\lambda_t-\lambda_{\beta'm}|$). In such variations, $\lambda_t$ can be 1.0. Accordingly, $\alpha"$ is equal to $|1.0-\lambda_{\alpha'm}|$, $\beta"$ is equal to $|1.0-\lambda_{\beta'm}|$, and the adjusted target $\lambda$ value is updated as a function of these values for $\alpha"$ and $\beta"$ as discussed in greater detail below. For example, a third delta '$\Delta$' can be defined as a difference between the first delta $\alpha"$ and the second delta $\beta"$ (i.e., $\lambda=\alpha"-\beta"$) and the adjusted target $\lambda$ value is updated as a function of the third delta $\Delta$.

After the adjusted target $\lambda$ value is updated at 290, the engine controller 105 proceeds to determine if $T_{PF}$ is greater than or equal to $T_{th}$, at 220. If $T_{PF}$ is greater than or equal to $T_{th}$, then the engine controller 105 proceeds to 230 for the PF 156 regeneration. Alternatively, the engine controller 105 proceeds back through 240-290 to adjust target $\lambda$ values until the $T_{PF}$ is greater than or equal to $T_{th}$ and at which time regeneration of the PF 156 begins at 230. Accordingly, the engine controller 105 provides for enhanced PF regeneration using measured $\lambda$ values from the pair of post-converter UHEGO sensors 143', 145' to adjust at least one target $\lambda$ value for the pair of pre-converter UHEGO sensors 143, 145.

Figure 5:
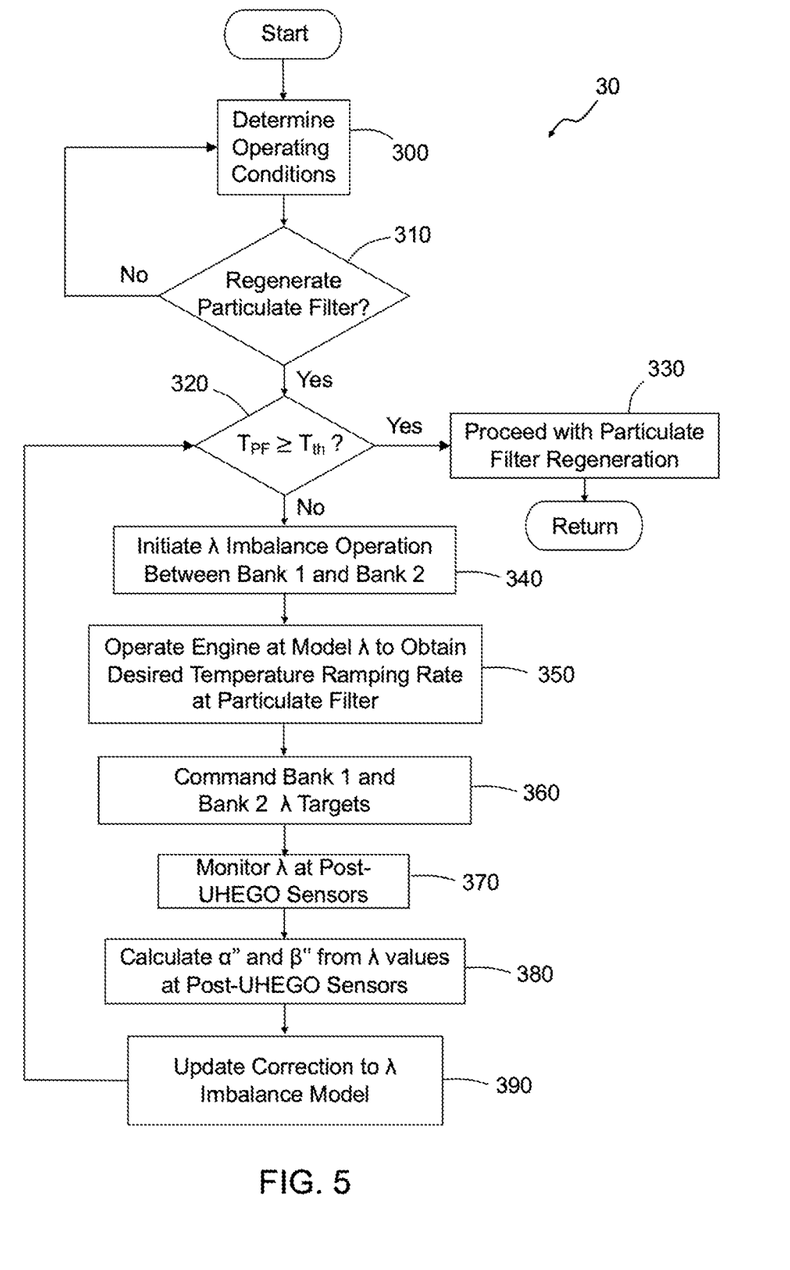
FIG. 5 is a flowchart of a method for regeneration of a particulate filter according to another form of the present disclosure.

The method 20 (FIG. 4) uses the measured $\lambda$ values from the pair of post-converter UHEGO sensors 143', 145' to adjust at least one target $\lambda$ value. In another form of the present disclosure, FIG. 5 shows a flowchart for a method 30 performed by the engine controller 105 to use the measured $\lambda$ values from the pair of post-converter UHEGO sensors 143', 145' to adjust a model that updates adjusted target $\lambda$ value(s). Particularly, and similar to the method 20, the engine controller 105 determines the operating conditions of the ICE 100 at 300 and determines whether or not regeneration of the PF 156 is needed at 310. If regeneration of the PF 156 is not needed (i.e., 'No' at 310), the engine controller 105 returns to 300 where the operating conditions of the ICE 100 are determined (i.e., monitored). If regeneration of the PF 156 is needed (i.e., 'Yes' at 310), the controller 105, at 320, determines whether or not $T_{PF}$ is greater than or equal to Tt. If $T_{PF}$ is greater than or equal to the Tt, then passive regeneration of the PF 156 proceeds by oxidation of the particulate mass and the engine controller 105 proceeds back to 300. If $T_{PF}$ is not greater than or equal to $T_{th}$, then the engine controller 105 initiates lambda imbalance regeneration of the PF 156, at 340, which includes operating the ICE 100 according to a model $\lambda$ value (e.g., a $\lambda$ value at the PF 156 based on a model for PF regeneration and referred to herein as a "PF regeneration model") to obtain a desired temperature ramp rate of exhaust gas flowing through the PF 156 at 350. That is, the engine controller 105 is configured to include a PF regeneration model for regenerating the PF 156 that provides a model λ value for obtaining a desired heating rate of exhaust gas flowing through the PF 156 at 350.

Still referring to FIG. 5, based on the PF regeneration model and heating rate for the PF 156, the engine controller 105 determines target λ values for exhaust gas flowing through the first cylinder bank 110 and/or the second cylinder bank 120 prior to the pair of TWC converters 152, 154, at 360. It should be understood that the target λ values for the first cylinder bank 110 and/or the second cylinder bank 120 may be monitoring based on measurements from the first and/or second pre-converter UHEGO sensors 143, 145.

At 370, the engine controller 105 monitors the measured λ value at the first and/or second post-converter UHEGO sensors 143', 145'. The engine controller 105 develops or calculates an α" value and/or develops or calculates an β" value as discussed above with respect to method 20. After the PF regeneration model target λ value is updated or adjusted at 390, the engine controller 105 proceeds back to 320 to determine if $T_{PF}$ is greater than or equal to $T_{th}$. If so, the engine controller 105 proceeds to 330 where regeneration of the PF 156 starts. Alternatively, if $T_{PF}$ is not greater than or equal to Tt, then the engine controller 105 proceeds back through 340-390 again. The cycle of method 30 proceeding through 340-390 continues until the $T_{PF}$ is greater than or equal to $T_{th}$ and at which time regeneration of the PF 156 begins at 330. After regeneration of the PF 156 begins at 330, the method 30 stops or returns to 310. Accordingly, the method 30 provides for enhanced PF regeneration using a PF regeneration model and measured λ values from the pair of post-converter UHEGO sensors 143', 145' to adjust at least one target λ value for the pair of pre-converter UHEGO sensors 143, 145.

It should be understood that similar methods can be used for PF regeneration using systems 12 and 14 described above. For example, and with reference to the system 12 (FIG. 2), a method for PF regeneration uses a measured λ value from the post-converter UHEGO sensor 149 to adjust or update at least one target λ value and/or to adjust or update a PF regeneration model target λ value. Also, and with reference to system 14 (FIG. 3), a method for PF regeneration uses a measured λ values from the pair of post-converter UHEGO sensors 143', 145' and/or the post-converter UHEGO sensors 149 to adjust or update at least one target λ value and/or to adjust or update a PF regeneration model target λ value.

In order to better illustrate the teachings of the present disclosure, but not limit the scope of the present disclosure in any manner, a non-limiting examples of a system and method for PF regeneration is provided.

EXAMPLES

Figure 6:
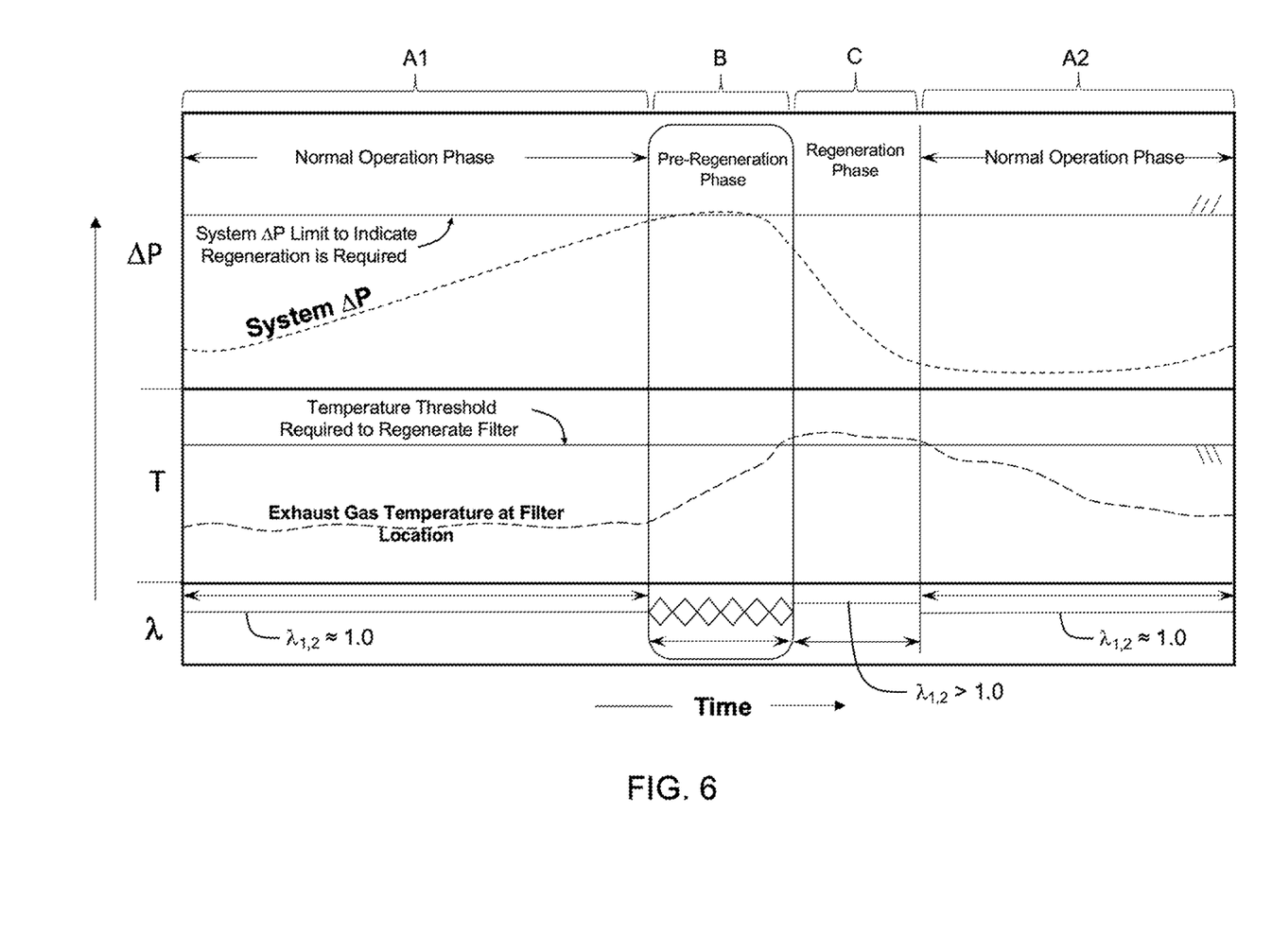
FIG. 6 shows plots for exhaust gas lambda, exhaust gas temperature and exhaust system backpressure for a normal operation phase, a pre-regeneration operation phase, regeneration operation phase and another normal operation phase of an internal combustion engine.

Referring to FIG. 6, a plot of lambda (λ) for the first cylinder bank 110 ($λ_1$) and the second cylinder bank 120 ($λ_2$), a plot of temperature (T) at the PF 156 location, and a plot of backpressure (ΔP) of the V-pipe exhaust system 140 as a function of time is shown. The plots shown in FIG. 6 correspond to a normal operation phase of the ICE 100 and the PF 156 (labeled 'A1'), a pre-regeneration operation phase of the ICE 100 and the PF 156 (labeled 'B'), a regeneration operation phase of the ICE 100 and the PF 156 (labeled 'C'), and another normal operation phase of the ICE 100 and the PF 156 (labeled 'A2'). As shown in FIG. 6, during the first normal operation phase A1, $λ_1$ and $λ_2$ are about 1.0, the exhaust gas temperature at the PF 156 location is generally constant and below a temperature threshold desired to regenerate the PF 156. However, as particulate mass accumulates in the PF 156 over time, the backpressure ΔP increases. When the backpressure increases above a predefined limit, the system 10 initiates the pre-regeneration phase B where the temperature of the exhaust gas at the PF 156 location steadily increases until the temperature reaches and/or slightly exceeds the temperature threshold desired to regenerate the PF 156. Increasing the temperature of the exhaust gas at the PF 156 is provided by alternately switching the first cylinder bank 110 and the second cylinder bank 120 between rich and lean operating conditions (i.e., k <1.0 and λ>1.0). Such operation of the first and second cylinder bank 110, 120 provides an exhaust gas mixture of excess fuel (i.e., excess reductants) and excess oxygen such that the excess fuel is catalytically reacted in the presence of a catalyst (e.g., platinum group metals (PGM)) and the temperature of the exhaust gas flowing through the PF 156 increases. However, control of the rate of temperature increase of the exhaust gas at the PF 156 location is desired in order to prevent "runaway" oxidation of the particulate mass in the PF 156 and/or emission slippage of the ICE 100.

Example 1

Referring back to system 10 in FIG. 1, in one example, and assuming a target λ value for exhaust gas flowing through the PF 156 is unity ($λ_t$=1.0) during the pre-regeneration phase A, the engine controller 105 sets an imbalance target λ value for exhaust gas flowing through the first pipe 142 upstream of the TWC converter 152 to 1.020 (i.e., lean lambda target; $λ_{α t}$=1.020) and an imbalance target λ value for exhaust gas flowing through the second pipe 144 upstream of TWC converter 154 equal to 0.980 (i.e., a right lambda target; $λ_{β t}$=0.980) to provide a desired heating rate for exhaust gas flowing through the PF 156.

However, if the measured λ value from the first post-converter UHEGO sensor 143' is equal to 1.018 ($λ_{α' m}$=1.018) and the measured λ value from the second post-converter UHEGO sensor 145' is equal to 0.980 ($λ_{β' m}$=0.980), the engine controller 105 adjusts the target exhaust gas lambda values to compensate for the difference between the pre-converter λ values and the post-converter λ values. That is, due to reduction of NOx to $N_2$, oxidation of CO to $CO_2$, and/or oxidation of unburnt hydrocarbons into $CO_2$ and $H_2O$ within the exhaust gas flowing through the pair of TWC converters 152, 154, the pair of post-converter UHEGO sensors 143', 145' provide an enhanced or more accurate λ value for the exhaust gas flowing into the PF 156.

As discussed above, a first delta α"can be defined as α"=$|λ_t-λ_{α' m}|$=|1.0−1.018|=0.018 and a second delta β"can be defined as β"=$|λ_t-λ_{γ' m}|$=|1.0−0.980|=0.020. Also, in some variations a third delta Δ can be defined as a difference between α"and β". Particularly, in at least one variation of the present disclosure the third delta is defined as α"−β". In such variations the third delta equals 0.018−0.020=−0.002. Given that α"−β" (i.e., the third delta) is less than 0.0, the overall measured λ value for exhaust gases in the first pipe 142 and the second pipe 144, downstream from the first and second TWC converters 152, 154, respectively, is rich and the engine controller 105 adjusts the target value for the first pre-converter UHEGO sensor α and/or the second pre-converter UHEGO sensor 145 to a leaner setting (i.e., a leaner adjusted target λ value). As used herein the term "leaner" refers the phrase "leaner adjusted target λ value" refers to a more positive value or more positive setting for a λ value (e.g., 1.022 is "more positive" than 1.020, and thus, a leaner value). Particularly, and since $\alpha''-\beta''=-0.002$, a lean correction of $0.002\lambda$ is executed by the engine control 105 by adjusting the target $\lambda$ value for the first pre-converter UHEGO sensor $\alpha$ to 1.022 ($\lambda_{\alpha t}=1.022$) and holding the target $\lambda$ value for the second pre-converter UHEGO sensor 145 at 0.980 ($\lambda_{\beta t}=0.980$). The system 10 continues to monitor the measured $\lambda$ values $\lambda_{\alpha'm}$ and $\lambda_{\beta'm}$ and adjust the target $\lambda$ values $\lambda_{\alpha t}$ and $\lambda_{\beta t}$ in order to control the rate of temperature increase of the exhaust gas at the PF 156 location.

Example 2

Still referring to FIG. 1, in another example, and assuming $\lambda_t=1.0$, $\lambda_{\alpha t}=1.020$, and at $\lambda_{\beta t}=0.980$, a measured $\lambda$ value from the first post-converter UHEGO sensor 143' is equal to 1.022 ($\lambda_{\alpha'm}=1.022$) and a measured $\lambda$ value from the second post-converter UHEGO sensor 145' is equal to 0.990 ($\lambda_{\beta'm}=0.990$). Also, $\alpha''=|\lambda_t-\lambda_{\alpha'm}|=|1.0-1.022|=0.022$ and $\beta''=|\lambda_t-\lambda_{\beta'm}|=|1.0-0.990|=0.010$, and $\alpha''-\beta''=0.022-0.010=+0.012$. Given that $\alpha''-\beta''$ is greater than 0.0, the overall measured $\lambda$ value for exhaust gases in the first pipe 142 and the second pipe 144, downstream from the first and second TWC converters 152, 154, respectively, is lean and the engine controller 105 adjusts the target value for the first pre-converter UHEGO sensor 143 and/or the second pre-converter UHEGO sensor 145 to a richer setting, i.e., a richer adjusted target $\lambda$ value. As used herein the term "richer" and the phrase "richer adjusted target $\lambda$ value" refers to a less positive value or less positive setting for a $\lambda$ value (e.g., 1.014 is "less positive" than 1.020, and thus richer). Particularly, and since $\alpha''-\beta''=+0.012$, a rich correction of $-0.012\lambda$ is executed by the engine controller 105 by adjusting the target $\lambda$ value for the first pre-converter UHEGO sensor $\alpha$ to 1.014 ($\lambda_{\alpha t}=1.014$) and setting an adjusted target $\lambda$ value for the second pre-converter UHEGO sensor 145 to 0.974 ($\lambda_{\beta t}=0.974$). The system 10 continues to monitor the measured $\lambda$ values $\lambda_{\alpha't}$ and $\lambda_{\beta't}$ and adjust the target $\lambda$ values $\lambda_{\alpha t}$ and $\lambda_{\beta t}$ in order to control the rate of temperature increase of the exhaust gas at the PF 156 location.

Example 3

Still referring to FIG. 1, in still another example, and assuming $\lambda_t=1.0$, $\lambda_{\alpha t}=1.020$, and $\alpha_{\beta t}=0.980$, a measured $\lambda$ value from the first post-converter UHEGO sensor 143' is equal to 1.020 ($\lambda_{\alpha'm}=1.020$) and a measured $\lambda$ value from the second post-converter UHEGO sensor 145' is equal to 0.980 ($\lambda_{\beta'm}=0.980$). Also, $\alpha''=|\lambda_t-\lambda_{\alpha'm}|=|1.0-1.020|=0.020$ and $\beta''=|\lambda_t-\lambda_{\beta'm}|=|1.0-0.980|=0.020$, and $\alpha''-\beta''=0.020-0.020=0.0$. Given that $\alpha''-\beta''$ equals 0.0, the overall measured $\lambda$ value for exhaust gases in the first pipe 142 and the second pipe 144, downstream from the first and second TWC converters 152, 154, respectively, is equal to 1.0 and the engine control 105 does not adjust $\lambda_{\alpha t}$ or $\lambda_{\beta t}$. However, the system 10 does continue to monitor the measured $\lambda$ values $\lambda_{\alpha't}$ and $\lambda_{\beta't}$ and adjust the target $\lambda$ values $\lambda_{\alpha t}$ and $\lambda_{\beta t}$, when needed, in order to control the rate of temperature increase of the exhaust gas at the PF 156 location.

Example 4

Referring now to system 12 in FIG. 2, in still yet another example, and assuming a target $\lambda$ value for exhaust gas flowing past the single post-converter UHEGO sensor 149 and through the PF 156 is unity ($\lambda_{\omega t}=1.0$) during the pre-regeneration phase A, the engine controller 105 sets an imbalance target $\lambda$ value for exhaust gas flowing through the first pipe 142 upstream of the TWC converter 152 to 1.05 (i.e., lean lambda target; $\lambda_{\alpha t}=1.05$) and an imbalance target $\lambda$ value for exhaust gas flowing through the second pipe 144 upstream of TWC converter 154 equal to 0.95 (i.e., a right lambda target; $\lambda_{\beta t}=0.95$) to provide a desired heating rate for exhaust gas flowing through the PF 156.

However, if the measured $\lambda$ values are $\lambda_\alpha=1.05$, $\lambda_\beta=0.95$, and $\lambda_\omega=1.01$, the engine controller 105 adjusts the target exhaust gas lambda values to compensate for the difference between the pre-converter $\lambda$ values and the post-converter $\lambda$ value. For example, and given that $\lambda_\omega=1.01$ is leaner than the $\lambda_{\omega t}$ value of 1.0, the engine controller 105 adjusts $\lambda_{\alpha t}$ to 1.045 (i.e., $\lambda_{\alpha t}=1.045$) and $\lambda_{\beta t}$ to 0.975 (i.e., $\lambda_{\beta t}=0.975$). The system 12 continues to monitor the measured $\lambda$ values $\lambda_\alpha$, $\lambda_\beta$, $\lambda_\omega$ and adjusts the target $\lambda$ values $\lambda_{\alpha t}$ and $\lambda_{\beta t}$ in order to control the rate of temperature increase of the exhaust gas at the PF 156 location.

Example 5

Referring now to system 14 in FIG. 3, in another example, and assuming a target $\lambda$ value for exhaust gas flowing past the post-converter UHEGO sensor 149 and through the PF 156 is unity ($\lambda_t=1.0$) during the pre-regeneration phase A, the engine controller 105 sets an imbalance target $\lambda$ value for exhaust gas flowing through the first pipe 142 upstream of the TWC converter 152 to 1.05 (i.e., lean lambda target; $\lambda_{\alpha t}=1.05$) and an imbalance target $\lambda$ value for exhaust gas flowing through the second pipe 144 upstream of TWC converter 154 equal to 0.95 (i.e., a right lambda target; $\lambda_{\beta t}=0.95$) to provide a desired heating rate for exhaust gas flowing through the PF 156.

However, if the measured $\lambda$ values are $\lambda_{\alpha'}=1.06$, $\lambda_{\beta'}=0.95$, and $\lambda_\omega=1.02$, the engine controller 105 adjusts the target exhaust gas lambda values to compensate for the difference between the pre-converter $\lambda$ values and the post-converter $\lambda$ values. For example, and given that $\lambda_{107}=1.02$ is leaner than the $\lambda_{\omega t}$ value of 1.0, the engine controller 105 adjusts $\lambda_{\alpha t}$ to 1.03 (i.e., $\lambda_{\alpha t}=1.03$) and $\lambda_{\beta t}$ to 0.95 (i.e., $\lambda_{\beta t}=0.95$). The system 14 continues to monitor the measured $\lambda$ values $\lambda_{\alpha'}$, $\lambda_{\beta'}$, $\lambda_\omega$ and adjusts the target $\lambda$ values $\lambda_{\alpha t}$ and $\lambda_{\beta t}$ in order to control the rate of temperature increase of the exhaust gas at the PF 156 location.

Based on the foregoing, the following provides a general overview of the present disclosure and is not a comprehensive summary.

In one form of the present disclosure, a system for regeneration of a particulate filter in a V-pipe exhaust system includes a pair of post-converter UHEGO sensors disposed at a pair of pipes of the V-pipe exhaust system downstream from a pair of TWC converters and the pair of post-converter UHEGO sensors measure lambda values. The system also includes an engine controller in communication with the pair of post-converter UHEGO sensors. The engine controller is configured to receive and compare measured lambda values from the pair of post-converter UHEGO sensors to a target exhaust gas lambda value for exhaust gas flowing into the particulate filter and provide at least one adjusted target exhaust gas lambda value as a function of a difference between the measured lambda values and the target exhaust gas lambda value.

In some variations of the present disclosure the pair of post-converter UHEGO sensors includes a first post-converter UHEGO sensor disposed downstream a first TWC converter at a first pipe of the pair of pipes of the V-pipe exhaust system and a second post-converter UHEGO sensor disposed downstream a second TWC converter at a second pipe of the pair of pipes of the V-pipe exhaust. Also, the engine controller is configured to calculate a first delta, a second delta and a third delta. The first delta is a function of a difference between the target exhaust gas lambda value for the exhaust gas flowing into the particulate filter and a measured lambda value for the first post-converter UHEGO sensor. The second delta is a function of a difference between the target exhaust gas lambda value for the exhaust gas flowing into the particulate filter and a measured lambda value for the second post-converter UHEGO sensor. The third delta is a difference between the first delta and the second delta. In at least one variation the engine controller is configured to provide the at least one of the adjusted target exhaust gas lambda value as a function of the third delta.

In some variations the first delta is an absolute value of the difference between the target exhaust gas lambda value and the measured lambda value for the first post-converter UHEGO sensor. Also, the second delta is an absolute value of the difference between the target exhaust gas lambda value and the measured lambda value for the second post-converter UHEGO sensor. In such variations, the engine controller is configured to provide a leaner adjusted target exhaust gas lambda value when the third delta is less than zero and provide a richer adjusted target exhaust gas lambda value when the third delta is greater than zero. As used herein, the phrase "leaner adjusted target exhaust gas lambda value" refers to an adjusted target exhaust gas lambda value that is more positive than a previous target exhaust gas lambda value or adjusted target exhaust gas lambda value, and the phrase "richer adjusted target exhaust gas lambda value" refers to an adjusted target exhaust gas lambda value that is less positive than a previous target exhaust gas lambda value or adjusted target exhaust gas lambda value.

In some variations the system includes a pair of pre-converter UHEGO sensors disposed at the pair of pipes of the V-pipe exhaust system upstream from the pair of TWC converters and the engine controller provides the at least one adjusted target exhaust gas lambda value to at least one of the pair of pre-converter UHEGO sensors. In such variations, the pair of pre-converter UHEGO sensors can be a first pre-converter UHEGO sensor disposed upstream a first TWC converter at a first pipe of the pair of pipes and a second pre-converter UHEGO sensor disposed upstream a second TWC converter at a second pipe of the pair of pipes. Also, the pair of post-converter UHEGO sensors can be a first post-converter UHEGO sensor disposed downstream the first TWC converter at the first pipe of the pair of pipes and a second post-converter UHEGO sensor disposed downstream the second TWC converter at the second pipe of the pair of pipes. In at least one such variation the engine controller is configured to calculate a first delta, a second delta and a third delta. The first delta is a function of a difference between the target exhaust gas lambda value for the exhaust gas flowing into the particulate filter and a measured lambda value for the first post-converter UHEGO sensor. The second delta is as a function of a difference between the target exhaust gas lambda value for the exhaust gas flowing into the particulate filter and a measured lambda value for the second post-converter UHEGO sensor. The third delta is a difference between the first delta and the second delta.

In some variations the at least one adjusted target exhaust gas lambda value is a function of the third delta and the engine controller is configured to provide the at least one adjusted target exhaust gas lambda value to at least one of the first and second pre-converter UHEGO sensors. In at least one variation, the first delta is the absolute value of the difference between the target exhaust gas lambda value for the exhaust gas flowing into the particulate filter and the measured lambda value for the first post-converter UHEGO sensor, and the second delta is the absolute value of the difference between the target exhaust gas lambda value for the exhaust gas flowing into the particulate filter and the measured lambda value for the second post-converter UHEGO sensor. In such variations, the engine controller is configured to provide a leaner adjusted target exhaust gas lambda value to at least one of the first and second pre-converter UHEGO sensors when the third delta is less than zero and provide a richer adjusted target exhaust gas lambda value to at least one of the first and second pre-converter UHEGO sensors when the third delta is greater than zero.

In some variations the system further includes a particulate filter disposed in a V-exhaust exit pipe downstream from the first and second post-converter UHEGO sensors and the engine controller is configured to provide the richer adjusted target exhaust gas lambda value and the leaner adjusted target exhaust gas lambda value to at least one of the first and second pre-converter UHEGO sensors such that a rate of temperature increase of exhaust gas passing through the particulate filter is controlled.

In another form of the present disclosure, a system for regeneration of a particulate filter in a V-pipe exhaust system includes a first TWC converter disposed in a first pipe of the V-pipe exhaust system extending between an internal combustion engine and an exit pipe of the V-pipe exhaust system and a second TWC converter disposed in a second pipe of the V-pipe exhaust extending between the internal combustion engine and the exit pipe. A particulate filter is disposed in the exit pipe downstream from the first and second TWC converters, a first pre-converter UHEGO sensor is disposed at the first pipe upstream from the first TWC converter and a second pre-converter UHEGO sensor is disposed at the second pipe upstream from the second TWC converter. Also, a first post-converter UHEGO sensor is disposed at the first pipe downstream from the first TWC converter and a second post-converter UHEGO sensor is disposed at the second downstream from the second TWC converter. An engine controller is included and is in communication with the first and second pre-converter UHEGO sensors and the first and second post-converter UHEGO sensors. And the engine controller is configured to receive measured lambda values from the first and second post-converter UHEGO sensors and generate a target exhaust gas lambda value for each of the first and second pre-converter UHEGO sensors for lambda imbalance regeneration of a particulate filter.

In some variations the engine controller is configured to calculate a first delta, a second delta and a third delta. The first delta is defined as a function of a difference between a target exhaust gas lambda value for the exhaust gas flowing into the particulate filter and a measured lambda value for the first post-converter UHEGO sensor. The second delta is defined as a function of a difference between the target exhaust gas lambda value for the exhaust gas flowing into the particulate filter and a measured lambda value for the second post-converter UHEGO sensor. The third delta is defined as a difference between the first delta and the second delta. In at least one variation the engine controller is configured to adjust a target exhaust gas lambda value for at least one of the first and second pre-converter UHEGO sensors as a function of the third delta.

In some variations the first delta is as an absolute value of the difference between the target exhaust gas lambda value for the exhaust gas flowing into the particulate filter and the measured lambda value for the first post-converter UHEGO sensor, and the second delta is an absolute value of the difference between the target exhaust gas lambda value for the exhaust gas flowing into the particulate filter and the measured lambda value for the second post-converter UHEGO sensor. In such variations, the engine controller is configured to provide a leaner adjusted target exhaust gas lambda value to at least one of the first and second pre-converter UHEGO sensors when the third delta is less than zero and provide a richer adjusted target exhaust gas lambda value to at least one of the first and second post-converter UHEGO sensors when the third delta is greater than zero.

In still another form of the present disclosure, a method for regeneration of a particulate filter in a V-pipe exhaust system includes controlling a rate of temperature increase of exhaust gas passing through the particulate filter by adjusting target exhaust gas lambda values for a pair of pre-converter UHEGO sensors located upstream from a pair of TWC converters disposed at a pair of pipes of the V-pipe exhaust system. A difference between a target exhaust gas lambda value for the exhaust gas flowing into the particulate filter and a measured lambda value for each of the pair of post-converter UHEGO sensor is calculated and the target exhaust gas lambda values for the pair of pre-converter UHEGO sensors are adjusted as a function of the calculated difference between the target exhaust gas lambda value for the exhaust gas flowing into the particulate filter and the measured lambda values for the pair of post-converter UHEGO sensors.

In some variations adjusting the target exhaust gas lambda values for the pair of pre-converter UHEGO sensors includes calculating a first delta, a second delta and a third delta. The first delta is a function of a difference between the target exhaust gas lambda value for the exhaust gas flowing into the particulate filter and a measured lambda value for the first post-converter UHEGO sensor. The second delta is a function of a difference between the target exhaust gas lambda value for the exhaust gas flowing into the particulate filter and a measured lambda value for the second post-converter UHEGO sensor. The third delta is a function of a difference between the first delta and the second delta. In at least one variation the target values for the first and second pre-converter UHEGO sensors are adjusted as a function of the third delta. In such variations, the target exhaust gas lambda value for at least one of the first and second pre-converter UHEGO sensors is adjusted to a leaner target exhaust gas lambda value when the third delta is less than zero and the target exhaust gas lambda value for at least one of the first and second pre-converter UHEGO sensors is adjusted to a richer target exhaust gas lambda value when the third delta is greater than zero.

In some variations of the present disclosure, a model for operating a lambda imbalance particulate filter regeneration will be operated by a programed engine controller that continuously monitors inputs from various sensors in the system, e.g., exhaust gas sensors, temperature sensors, flow rate monitoring sensors, among others. The lambda values from the post-converter UHEGO sensors, or any other location, are recorded to adjust or compensate for losses to the system over time. For example, when one of TWC converters ages more harshly than another TWC converter. Accordingly, the teachings of the present disclosure account for changes in component performances over time.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A system for regeneration of a particulate filter in a V-pipe exhaust system, the system comprising:
   a pair of post-converter universal heated exhaust gas oxygen (UHEGO) sensors disposed at a pair of pipes of the V-pipe exhaust system downstream from a pair of three-way catalytic (TWC) converters, wherein the pair of post-converter UHEGO sensors measure lambda values; and
   an engine controller in communication with the pair of post-converter UHEGO sensors, wherein the engine controller is configured to receive and compare measured lambda values from the pair of post-converter UHEGO sensors to a target exhaust gas lambda value for exhaust gas flowing into the particulate filter and provide at least one adjusted target exhaust gas lambda value as a function of a difference between the measured lambda values and the target exhaust gas lambda value.

2. The system according to claim 1, wherein:
the pair of post-converter UHEGO sensors includes a first post-converter UHEGO sensor disposed downstream a first TWC converter at a first pipe of the pair of pipes of the V-pipe exhaust system and a second post-converter UHEGO sensor disposed downstream a second TWC converter at a second pipe of the pair of pipes of the V-pipe exhaust, and
the engine controller is configured to:
calculate a first delta defined as a function of a difference between the target exhaust gas lambda value for the exhaust gas flowing into the particulate filter and a measured lambda value for the first post-converter UHEGO sensor;
calculate a second delta defined as a function of a difference between the target exhaust gas lambda value for the exhaust gas flowing into the particulate filter and a measured lambda value for the second post-converter UHEGO sensor; and
calculate a third delta defined as a difference between the first delta and the second delta.

3. The system according to claim 2, wherein the engine controller is configured to provide the at least one adjusted target exhaust gas lambda value as a function of the third delta.

4. The system according to claim 2, wherein:
the first delta is an absolute value of the difference between the target exhaust gas lambda value for the exhaust gas flowing into the particulate filter and the measured lambda value for the first post-converter UHEGO sensor; and
the second delta is an absolute value of the difference between the target exhaust gas lambda value for the exhaust gas flowing into the particulate filter and the measured lambda value for the second post-converter UHEGO sensor.

5. The system according to claim 4, wherein the engine controller is configured to provide a leaner adjusted target exhaust gas lambda value when the third delta is less than zero and provide a richer adjusted target exhaust gas lambda value when the third delta is greater than zero.

6. The system according to claim 1 further comprising a pair of pre-converter UHEGO sensors disposed at the pair of pipes of the V-pipe exhaust system upstream from the pair of TWC converters, wherein the engine controller provides the at least one adjusted target exhaust gas lambda value to at least one of the pair of pre-converter UHEGO sensors.

7. The system according to claim 6, wherein:
the pair of pre-converter UHEGO sensors is a first pre-converter UHEGO sensor disposed upstream a first TWC converter at a first pipe of the pair of pipes and a second pre-converter UHEGO sensor disposed upstream a second TWC converter at a second pipe of the pair of pipes;
the pair of post-converter UHEGO sensors is a first post-converter UHEGO sensor disposed downstream the first TWC converter at the first pipe of the pair of pipes and a second post-converter UHEGO sensor disposed downstream the second TWC converter at the second pipe of the pair of pipes; and
the engine controller is configured to:
calculate a first delta defined as a function of a difference between the target exhaust gas lambda value for the exhaust gas flowing into the particulate filter and a measured lambda value for the first post-converter UHEGO sensor;
calculate a second delta defined as a function of a difference between the target exhaust gas lambda value for the exhaust gas flowing into the particulate filter and a measured lambda value for the second post-converter UHEGO sensor; and
calculate a third delta defined as a difference between the first delta and the second delta.

8. The system according to claim 7, wherein the at least one adjusted target exhaust gas lambda value is a function of the third delta and the engine controller is configured to provide the at least one adjusted target exhaust gas lambda value to at least one of the first and second pre-converter UHEGO sensors.

9. The system according to claim 7, wherein:
the first delta is an absolute value of the difference between the target exhaust gas lambda value for the exhaust gas flowing into the particulate filter and the measured lambda value for a lean exhaust gas flowing past the first post-converter UHEGO sensor; and
the second delta is an absolute value of the difference between the target exhaust gas lambda value for the exhaust gas flowing into the particulate filter and the measured lambda value for a rich exhaust gas flowing past the second post-converter UHEGO sensor.

10. The system according to claim 9, wherein the engine controller is configured to:
provide a leaner adjusted target exhaust gas lambda value to at least one of the first and second pre-converter UHEGO sensors when third delta is less than zero; and
provide a richer adjusted target exhaust gas lambda value to at least one of the first and second pre-converter UHEGO sensors when the third delta is greater than zero.

11. The system according to claim 1 further comprising:
a first pre-converter UHEGO sensor disposed upstream a first TWC converter at a first pipe of the pair of pipes; and
a second pre-converter UHEGO sensor disposed upstream a second TWC converter at a second pipe of the pair of pipes, wherein:
the pair of post-converter UHEGO sensors is a first post-converter UHEGO sensor disposed downstream the first TWC converter at the first pipe of the pair of pipes and a second post-converter UHEGO sensor disposed downstream the second TWC converter at the second pipe of the pair of pipes; and
the engine controller is configured to:
calculate a first delta defined as a function of a difference between the target exhaust gas lambda value for the exhaust gas flowing into the particulate filter and a measured lambda value for the first post-converter UHEGO sensor;
calculate a second delta defined as a function of a difference between the target exhaust gas lambda value for the exhaust gas flowing into the particulate filter and a measured lambda value for the second post-converter UHEGO sensor; and
calculate a third delta defined as a difference between the first delta and the second delta.

12. The system according to claim 11, wherein:
the engine controller is configured to provide a leaner adjusted target exhaust gas lambda value to at least one of the first and second pre-converter UHEGO sensors when the first delta is an absolute value of the difference between the target exhaust gas lambda value for the exhaust gas flowing into the particulate filter and the measured lambda value for a lean exhaust gas flowing past the first post-converter UHEGO sensor;

the second delta is an absolute value of the difference between the target exhaust gas lambda value for the exhaust gas flowing into the particulate filter and the measured lambda value for a rich exhaust gas flowing past the second post-converter UHEGO sensor; and the third delta is less than zero.

13. The system according to claim 12 further comprising:
a particulate filter disposed in an exit pipe of the V-pipe exhaust system downstream from the first and second post-converter UHEGO sensors, wherein the engine controller is configured to provide a richer adjusted target exhaust gas lambda value and the leaner adjusted target exhaust gas lambda value to at least one of the first and second pre-converter UHEGO sensors such that a rate of temperature increase of exhaust gas passing through the particulate filter is controlled.

14. A system for regeneration of a particulate filter in a V-pipe exhaust system, the system comprising:
a first three-way catalytic (TWC) converter disposed in a first pipe of the V- pipe exhaust system extending between an internal combustion engine and an exit pipe of the V-pipe exhaust system and a second TWC converter disposed in a second pipe of the V-pipe exhaust system extending between the internal combustion engine and the exit pipe;
a particulate filter disposed in the exit pipe downstream from the first and second TWC converters;
a first pre-converter universal heated exhaust gas oxygen (UHEGO) sensor disposed at the first pipe of the V-pipe exhaust upstream from the first TWC converter and a second pre-converter UHEGO sensor disposed at the second pipe of the V-pipe exhaust system upstream from the second TWC converter;
a first post-converter UHEGO sensor disposed at the first pipe of the V- pipe exhaust system pipe downstream from the first TWC converter and a second post-converter UHEGO sensor disposed at the second pipe of the V-exhaust system pipe downstream from the second TWC converter; and
an engine controller in communication with the first and second pre- converter UHEGO sensors and the first and second post-converter UHEGO sensors, wherein the engine controller is configured to receive measured lambda values from the first and second post-converter UHEGO sensors and generate a target exhaust gas lambda value for each of the first and second pre-converter UHEGO sensors for lambda imbalance regeneration of a particulate filter.

15. The system according to claim 14, wherein the engine controller is configured to:
calculate a first delta defined as a function of a difference between a target exhaust gas lambda value for the exhaust gas flowing into the particulate filter and a measured lambda value for the first post-converter UHEGO sensor;
calculate a second delta defined as a function of a difference between the target exhaust gas lambda value for the exhaust gas flowing into the particulate filter and a measured lambda value for the second post-converter UHEGO sensor;
calculate a third delta defined as a difference between the first delta and the second delta; and adjust an exhaust gas target exhaust gas lambda value for detection by at least one of the first and second pre-converter UHEGO sensors as a function of the third delta.

16. The system according to claim 15, wherein:
the first delta is defined as an absolute value of the difference between the target exhaust gas lambda value for the exhaust gas flowing into the particulate filter and the measured lambda value for the first post-converter UHEGO sensor; and
the second delta is defined as an absolute value of the difference between the target exhaust gas lambda value for the exhaust gas flowing into the particulate filter and the measured lambda value for the second post-converter UHEGO sensor.

17. The system according to claim 15, wherein the engine controller is configured to:
provide a leaner adjusted target exhaust gas lambda value to at least one of the first and second pre-converter UHEGO sensors when the third delta is less than zero; and
provide a richer adjusted target exhaust gas lambda value to at least one of the first and second post-converter UHEGO sensors when the third delta is greater than zero.

18. A method for regeneration of a particulate filter in a V-pipe exhaust system, the method comprising:
controlling a rate of temperature increase of exhaust gas passing through the particulate filter by adjusting target exhaust gas lambda values for a pair of pre-converter universal heated exhaust gas oxygen (UHEGO) sensors located upstream from a pair of three-way catalytic (TWC) converters disposed at a pair of pipes of the V-pipe exhaust system, wherein adjusting the target exhaust gas lambda values for the pair of pre-converter UHEGO sensors comprises:
calculating a difference between a target exhaust gas lambda value for the exhaust gas flowing into the particulate filter and a measured lambda value for each of the pair of post-converter UHEGO sensors; and
adjusting target exhaust gas lambda values for the pair of pre-converter UHEGO sensors as a function of a calculated difference between the target exhaust gas lambda value for the exhaust gas flowing into the particulate filter and the measured lambda values for the pair of post-converter UHEGO sensors.

19. The method according to claim 18, wherein adjusting the target exhaust gas lambda values for the pair of pre-converter UHEGO sensors comprises:
calculating a first delta defined as a function of a difference between the target exhaust gas lambda value for the exhaust gas flowing into the particulate filter and a measured lambda value for a lean exhaust gas flowing past a first post-converter UHEGO sensor;
calculating a second delta defined as a function of a difference between the target exhaust gas lambda value for the exhaust gas flowing into the particulate filter and a measured lambda value for a rich exhaust gas flowing past a second post-converter UHEGO sensor;
calculating a third delta defined as a function of a difference between the first delta and the second delta; and
adjusting the target values for the pair of pre-converter UHEGO sensors as a function of the third delta.

20. The method according to claim 19 further comprising:

adjusting a target exhaust gas lambda value for at least one of the pair of pre-converter UHEGO sensors to a leaner target exhaust gas lambda value when the third delta is less than zero; and adjusting a target exhaust gas lambda value for at least one of the pair of pre-converter UHEGO sensors to a richer target exhaust gas lambda value when the third delta is greater than zero.

* * * * *